Oct. 17, 1967  R. D. HODGES ETAL  3,348,183
ELECTRICAL COILS AND METHODS FOR PRODUCING SAME
Filed May 2, 1966  4 Sheets-Sheet 1
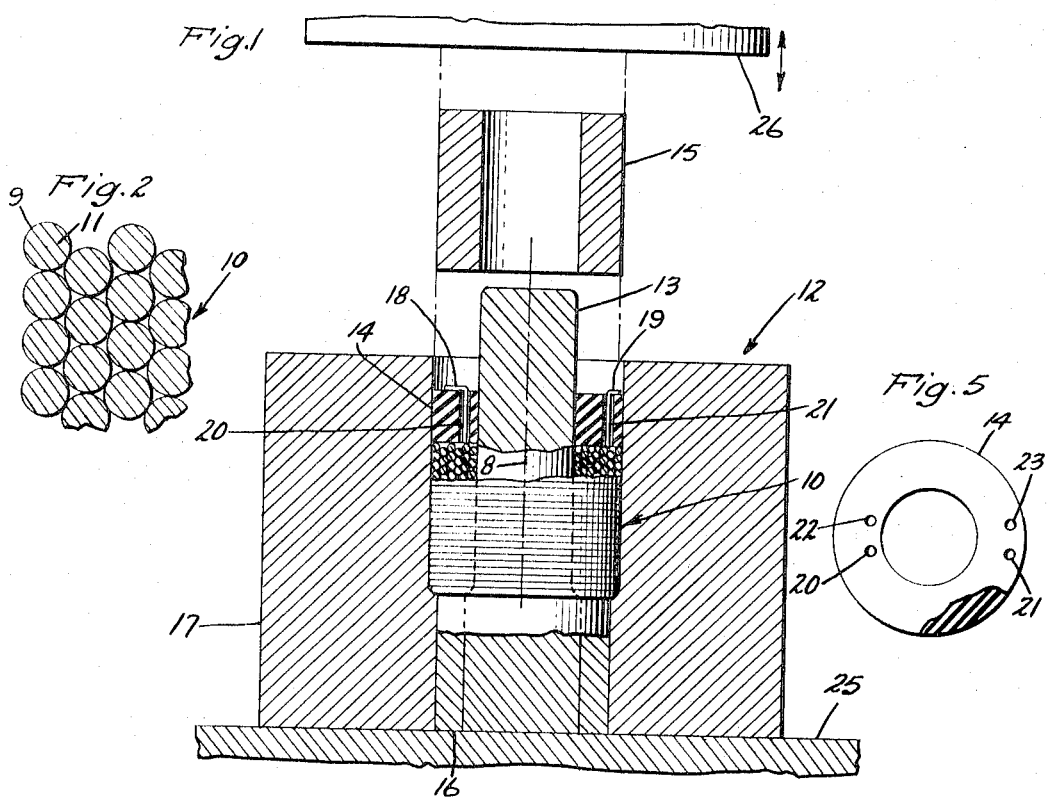
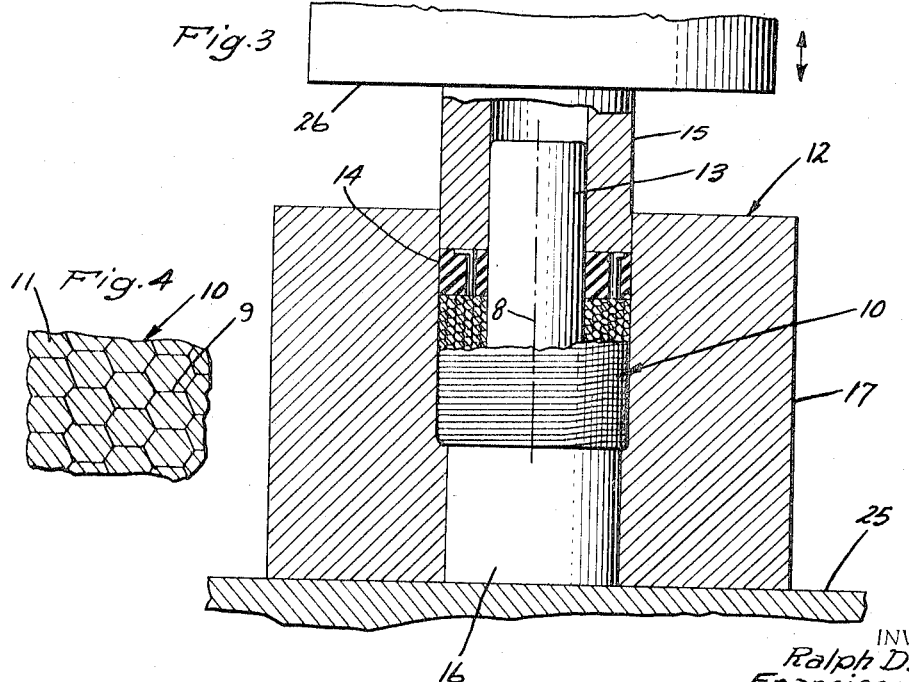
INVENTORS:
Ralph D. Hodges,
Francisco C. Avila,
BY Henry J Marciniak
Attorney.

Oct. 17, 1967 R. D. HODGES ETAL 3,348,183
ELECTRICAL COILS AND METHODS FOR PRODUCING SAME
Filed May 2, 1966 4 Sheets-Sheet 2
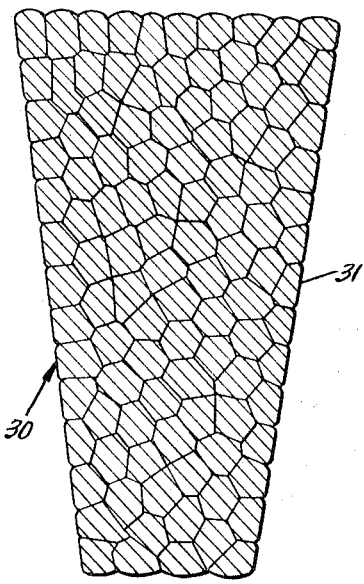
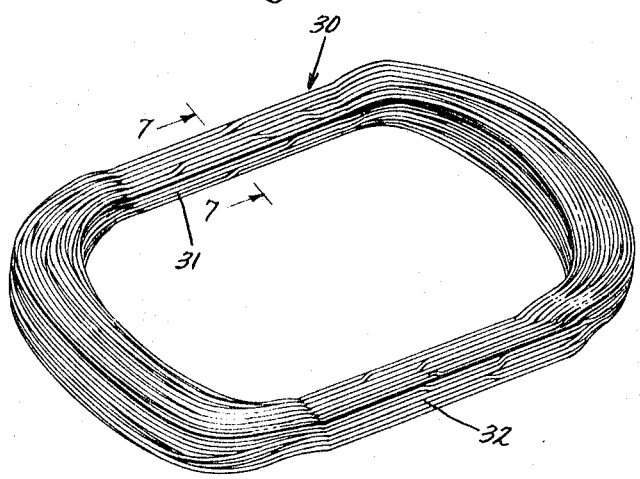
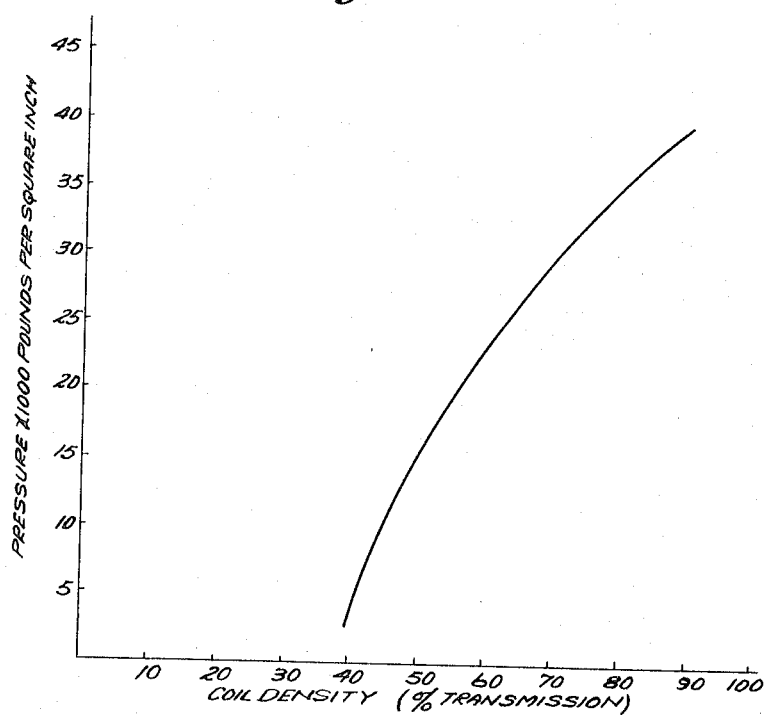
INVENTORS:
Ralph D. Hodges,
Francisco C. Avila,
BY
Attorney.

FIG_9
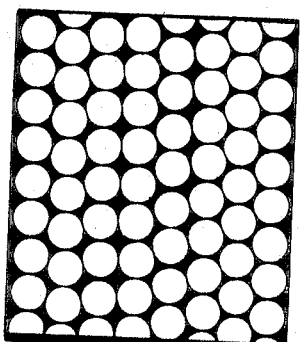
NO COMPRESSION
FIG_10
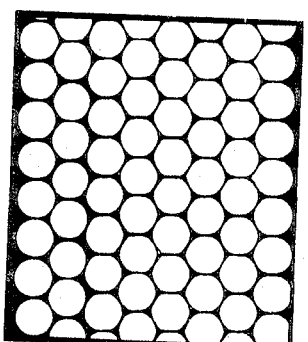
5000 p.s.i.
FIG_11
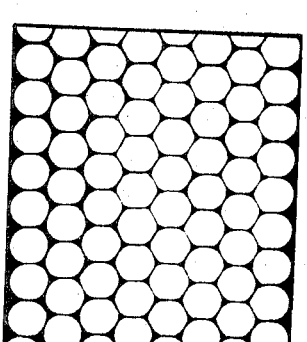
7000 p.s.i.
FIG_12
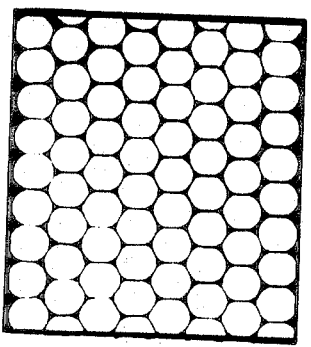
9000 p.s.i.
FIG_13
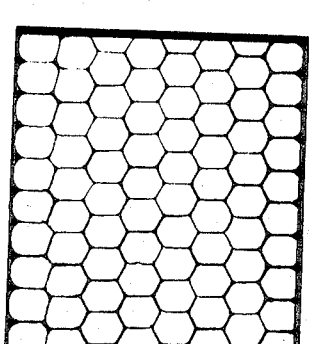
20,000 p.s.i.
FIG_14
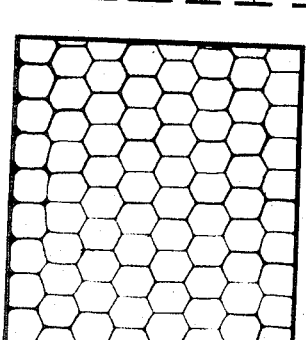
30,000 p.s.i.
FIG_15
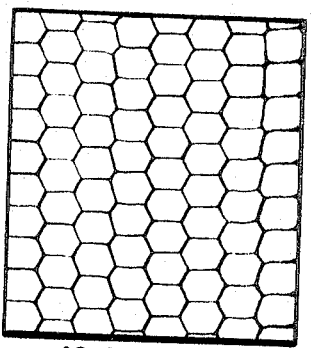
40,000 p.s.i.
FIG_16
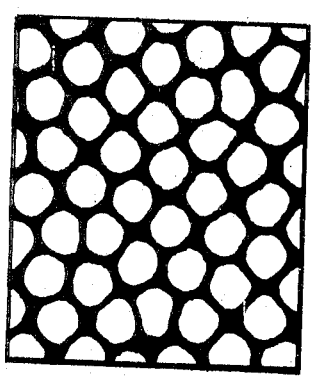
INVENTORS:
Ralph D. Hodges,
Francisco C. Avila,
BY
Attorney.

Oct. 17, 1967   R. D. HODGES ETAL   3,348,183
ELECTRICAL COILS AND METHODS FOR PRODUCING SAME
Filed May 2, 1966

INVENTORS:
Ralph D. Hodges,
Francisco C. Avila,
BY
Attorney.

3,348,183
ELECTRICAL COILS AND METHODS
FOR PRODUCING SAME
Ralph D. Hodges and Francisco C. Avila, Fort Wayne, Ind., assignors to General Electric Company, a corporation of New York
Filed May 2, 1966, Ser. No. 554,244
7 Claims. (Cl. 336—223)

This is a continuation-in-part of application Ser. No. 342,173 filed on Feb. 3, 1964, now abandoned. The invention relates to electrical coils, and more particularly, it relates to electrical coils characterized by improved density and thermal conductivity and to an improved method for producing such coils.

In the past, electrical coils such as galvanometer coils and others having a relatively low voltage per turn, have been preformed to smooth the outer surfaces or faces of the coil. Such a preformed galvanometer coil arrangement is described in U.S. Patent No. 1,041,293—Keller. It will be appreciated that a galvanometer coil generally has less than one millivolt per turn and that the volts per turn of an audio coil is normally less than half a volt. Obviously, the voltage stress between turns of such coils does not pose any problem.

Heretofore electrical coils with a relatively higher voltage per turn (5 volts or more), such as are used in transformers and in electric motors, insofar as is known to us, have not been subjected to relatively high pressures to achieve a deformation of the conductor wires in an electrical coil. For example in a typical fractional horsepower motor coil the volts per turn may be about 290 volts. It has been generally assumed that subjecting such a coil with relatively high volts per turn to relatively high pressures would cause copper-to-copper type of contacts between the conductors in the coil. Consequently, it was generally assumed that short circuits between adjacent conductors would result and initiate degradation processes in the magnet wire insulation that would cause premature failures of the coil.

In many applications where electrical coils are used, it is desirable that the coil conductors provide the maximum amount of conductivity per unit volume in order to achieve an economic utilization of conductive material. For example, in wound field direct current motors, amplidynes and other electric machines having removable pole pieces, the field windings usually consist of two or three coils wound with copper wire. The coils are placed on the field poles before the poles are assembled on the yoke. In such applications the space requirements have generally dictated that copper wire be used for the field coils. However, if a less expensive conducting material, such as aluminum, could be used to provide the same conductivity in the same cross-sectional space, a more economic utilization of conductive material could be achieved.

Further, in applications where there is a high rate of heat generation within the coil, such as in the coils of a ballast transformer or motor, it is desirable, if not necessary that the coil be characterized by good thermal conductivity. Unless the heat generated with a coil is effectively conducted to the ambient environment of a coil, the heat within the coil may result in overheating that will cause thermal degradation of the magnet wire insulation and thereby shorten the life expectancy of the coil.

Many electrical coils used in reactors and small transformers are wound on bobbins or spools. The bobbins provide a mechanical support for the coil turns during the winding operation and ground insulation when installed on a magnetic core. In some applications, it may be desirable for economic reasons to eliminate the bobbins and provide a free-standing coil or in other words, a coil that does not require a bobbin to prevent the turns from being displaced.

Accordingly, a general object of the present invention is to provide an improved electrical coil and a method of producing such a coil.

It is another object of the invention to provide an electrical coil that will provide an increased conductivity per unit cross sectional area of the coil and also to provide an improved method of producing such a coil.

A further object of the invention is to provide an improved free-standing electrical coil and also to provide a method of producing such a coil.

It is still another object of the present invention to provide an improved method for producing electrical coils that permits a more economic utilization of conductor materials.

In accordance with one form of our invention, we have provided an improved electrical coil for use in applications where the voltage per turn is five volts or more. The improved coil is comprised of a plurality of superposed turns of insulated conductor wire forming a winding with more than two layers of conductors. At least a portion of the winding is compressed at a pressure between 10,000 and 40,000 pounds per square inch to deform the conductor wire of the compressed portion from a circular cross section to a multi-sided cross section. Prior to compression the conductor wire preferably has a circular cross section with a diameter $D_o$ (diameter of the metallic conductor only) and also has prior to compression, an essentially uniform coating of synthetic resin with a radial thickness $h_o$, the ratio $D_o/h_o$ being not less than 18.

Contrary to what might be expected, we have discovered that when the winding is compressed, the synthetic resin enamel conforms to the multi-sided cross section of the deformed conductor wire to insulate adjacent conductors and a complete squeeze out of the enamel does not occur. Moreover, the electrical characteristics of a coil or a portion of a coil compacted at such relatively high pressures are not significantly impaired. Although some squeeze out of the synthetic resin insulating coating into the space between the conductors may occur, conductor-to-conductor type of contacts between adjacent conductors are not encountered as a result of the deformation of the coil conductors.

According to another form of the invention we have provided an improved method of providing a coil wherein the entire coil or a portion thereof is compressed in a mold having a predetermined shape at a pressure between 10,000 and 40,000 pounds per square inch. Prior to compression, the conductor wire preferably has a circular cross section with a diameter $D_o$ and a uniform layer synthetic resin enamel with a radial thickness $h_o$, that ratio of $D_o/h_o$ being not less than 18. After compression the coil conductors are deformed from a circular cross section to a multi-sided cross section. Whether the entire coil is deformed or only a portion thereof, it was found that the synthetic resin enamel conforms to the deformed multi-sided conductor wire to provide a continuous insulating film between adjacent conductors.

An important advantage resulting from the practice of the present invention is that in many applications of electrical coils, it is possible to supplant conventionally wound coils having insulated copper wire with more economic conductor wire such as aluminum. In many applications, for a given space requirement, it is possible to achieve an increase in the density of the coil using the same conductor wire. Moreover, it was found that coils embodying the invention possess improved life characteristics under transient voltage conditions and also are characterized by improved sound characteristics as compared to other noncompacted coils.

The subject matter which we regard as our invention is particularly pointed out and distinctly claimed in the concluding portion of this specification. Our invention, however, both as to organization and the method of making the improved electrical coils, together with further objects and advantages thereof, may be best understood by reference to the following description taken in conjunction with the accompanying drawings in which:

FIGURE 1 is a sectionalized view of a ring mold assembly and a coil partially in section and shown between the platens of a hydraulic press prior to compression;

FIGURE 2 is an enlarged fragmentary cross sectional view of a portion of the coil shown in FIGURE 1 prior to compression;

FIGURE 3 is a sectionalized view of the ring mold assembly shown in FIGURE 1 with the coil compressed at a pressure of approximately 20,000 pounds per square inch;

FIGURE 4 is an enlarged fragmentary cross sectional view of a portion of the coil shown in FIGURE 3;

FIGURE 5 is a top view of the annular rubber ring used in the ring mold assembly to protect the start and finish leads of the coil during compression;

FIGURE 6 is a perspective view of a motor coil embodying one form of the invention in which only portions of the coil have been compressed;

FIGURE 7 is an enlarged sectional view taken essentially along the section line 7—7 in FIGURE 6 of compressed portion of the motor coil and illustrating the varied deformation of the conductors obtained when the coil is compressed in a mold to provide a trapezoidal cross section conforming to the shape of the winding slots;

FIGURE 8 shows a curve illustrating a plot of pressure in pounds per square versus coil density expressed as a percent of light transmission for an aluminum coil embodying the invention;

FIGURE 9 shows an enlarged cross section of a portion of a cylindrical coil of the type illustrated in FIGURE 1 that has not been subjected to compression;

FIGURE 10 shows an enlarged cross sectional view of a portion of a coil identical to the one shown in FIGURE 9 but compressed at a pressure of 5,000 per square inch applied in a direction parallel to the axis of symmetry of the coil;

FIGURE 11 illustrates an enlarged view of a cross section of a portion of a coil identical to the one shown in FIGURE 9 but compressed at a pressure of 7,000 pounds per square inch applied in a direction parallel to the axis of symmetry of the coil;

FIGURE 12 illustrates an enlarged cross section of a portion of the coil identical to the one shown in FIGURE 9 but compressed at a pressure of 9,000 pounds per square inch applied in a direction parallel to the axis of symmetry of the coil;

FIGURE 13 is an enlarged view of a cross section of a portion of a coil identical to the one shown in FIGURE 9 but compressed at a pressure of 20,000 pounds per square inch applied in a direction parallel to the axis of symmetry of the coil;

FIGURE 14 is an enlarged cross section of a portion of a coil identical to the one shown in FIGURE 9 but compressed at a pressure of 30,000 pounds per square inch applied in a direction parallel to the axis of symmetry of the coil;

FIGURE 15 is an enlarged cross section of a coil identical to the one shown in FIGURE 9 but compressed at a pressure of 40,000 pounds per square inch applied in a direction parallel to the axis of symmetry of the coil;

FIGURE 16 shows an enlarged cross section of a portion of a coil compressed at a pressure of 40,000 pounds per square inch but having a conductor diameter-enamel thickness ratio $D_o/h_o$ less than 18;

Figure 17:
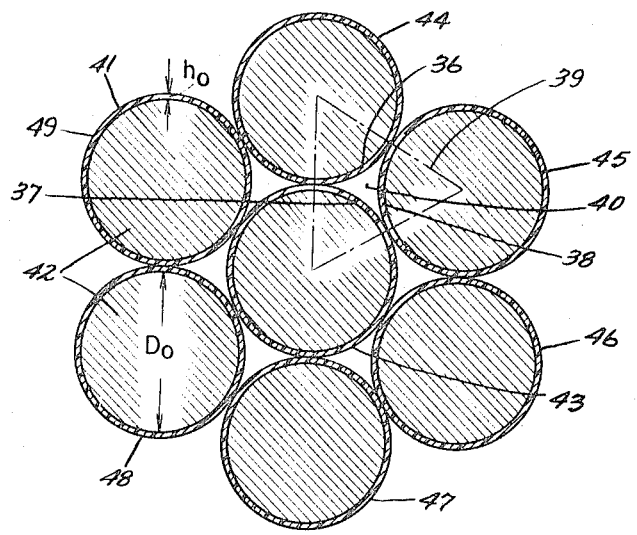
FIGURE 17 illustrates a cross section of six adjacent conductors in a precision coil.

In FIGURES 1 and 3, we have illustrated, by way of example, an apparatus that may be used to effect the compression of a cylindrical coil 10 in accordance with the invention. The coil 10 used in the illustrated exemplification of the invention is a cylindrical coil consisting of conductor wire insulated with a synthetic resin and wound symmetrically with respect to the axis 8 to form an electrical winding with a plurality of layers 11. The coil 10 was conventionally wound on an arbor to provide a coil with an inside diameter of approximately ¾ of an inch and an outside diameter of approximately 1⅜ of an inch.

It will be seen in FIGURE 1 that the coil 10 is positioned in a ring mold assembly 12 that includes a center mandrel 13, a rubber ring 14, an annular plunger 15, a punch ring 16 and a cylindrical mold member 17. Since external friction can be caused by sliding of the conductor wire 11 along the walls of the ring assembly 12, which constrain the coil 10 during compression, this friction may tend to cause the outside conductors of the coil 10 to assume a rectangular shape and result in an overstressing of the insulation. In order to minimize the effects of friction along the walls, all of the surfaces of the mold assembly 12 were given a No. 4 microinch finish and were flash chrome-plated.

With the coil 10 positioned on the center mandrel 13, the rubber ring 14 is placed on the top of the coil 10 so that the start and finish leads 18, 19 are threaded through the apertures 20 and 21 in the rubber ring 14. As is shown in FIGURE 5, the rubber ring 14 is formed with four apertures 20, 21, 22 and 23 to accommodate the start and finish leads 18, 19 of a bifilar coil. The rubber ring 14 prevents the start and finish leads 18 and 19 of coil 10 from being damaged during compression. It will, of course, be appreciated that where only a portion of a coil winding is being compressed, the provision of protection for the coil leads may not be required.

In the view of FIGURE 1 we have shown the annular plunger 15 in an elevated position over the rubber ring 14 in order to more clearly illustrate how the start and finish leads 18 and 19 are brought out through the apertures 20 and 21 of the rubber ring 14. It will be understood that with the coil 10 and the rubber ring 14 in position, the annular plunger 15 is placed over the rubber ring 14, the start and finish leads 18 and 19 being bent over on the rubber ring 14.

As is shown in FIGURE 1, the ring mold assembly 12 is supported on a fixed platen 25 of a hydraulic press, only portions of the platens 25, 26 being shown in FIGURES 1 and 3. To compress the coil 10 the movable platen 26 of the hydraulic press is lowered to apply the desired pressure to the coil 10 through the annular plunger 13 and the rubber ring 14. After the compression of the coil 10 is completed, the platen 25 is raised, and the compressed coil 10 is removed from the mold assembly by pushing out the center mandrel. The punch ring 16 facilitates the disassembly of the center mandrel 13.

It will be noted that the cross section of the conductor wire prior to compaction, as seen in FIGURE 2, was essentially circular. As will be seen in FIGURE 4, after compression the conductor wire has been deformed to a multi-sided cross section, most of the conductors being essentially hexagonal in cross section. It is believed that the compressive force applied to the coil subjects the metallic conductor wire to compression, and that the synthetic resin enamel on the conductor wire is subjected to tension as a result of the geometrical changes in the cross section of the conductor wire resulting from its deformation. It was found that the synthetic resin enamel 9 is, in effect, stretched to accommodate the changes in the geometry of the coil 10 without producing copper-to-copper contacts that might seriously impair the electrical characteristics of the coil 10. Preferably, the ratio of the original conductor wire diameter $D_0$ to the original synthetic resin layer or enamel thickness $h_0$ should not be less than 18, as will hereinafter be more fully explained, in order to achieve optimum benefits in space reduction and economic utilization of materials.

In many applications, such as in the coils used in a shaded pole induction motor having removable pole pieces, it is not necessary to compress the entire coil to obtain a high coil density in accordance with the present invention. As will be seen in the motor coil 30 shown in FIGURE 6, this coil has been compressed only across two portions 31 and 32 of the coil 30. The portions 31 and 32 of the coil 30 are assembled within the stator slots to make the maximum use of the slot volume.

Referring now to FIGURE 7, we have shown therein an enlarged cross section of the compressed portion 31. It will be seen that the compressed portion 31 has been molded to provide an essentially trapezoidal cross section that will conform with the slot sections of the motor. The adjacent conductors of the coil 30 have asymmetrical multisided cross sections. Even with such asymmetrical deformations of the conductor wire, it was discovered that synthetic resin enamel on the conductor wire accommodates to the changes in the geometry of the wire without shorting out.

By way of a more specific exemplification of the invention, six essentially identical cylindrical bifilar coils were wound with a 0.038 inch aluminum magnet wire having an insulating film of a synthetic resin enamel. The enamel film provided an increase in the overall diameter ranging from a minimum increase of .0024 to a maximum increase of .0033 of an inch. Thus, the ratio of the nominal bore conductor wire diameter $D_0$ to the enamel wire thickness $h_0$ was approximately 26.

The synthetic resin enamel used was a polyvinyl formal reacted wtih cresol formaldehyde resin as described in the Jackson and Hall Patent 2,307,588 and is known in the trade by the trademark Formex. The coils were compressed in the ring mold assembly 12 shown in FIGURES 1 and 3. The resistance of the coils were measured before and after compression, and after compression voltage breakdown tests were conducted on the coils. The density of the coils was also determined.

The breakdown voltage tests were made with a breakdown voltage tester providing a 250 volt per second rise with 0.1 ampere trip. This test voltage was applied across either of the two start or finish leads, and the voltage at which a 0.1 ampere circuit breaker was opened, was taken as the breakdown voltage.

In order to determine the density of the coils, the coils were positioned in the path of an X-ray beam which was directed at a ninety degree angle to the direction of pressing. The X-rays passing through the coils established an image on a fluoroscope screen. The fluorescence of the screen provided sufficient illuminations for photographic purposes, and it was found possible to register a negative image on a photographic plate. The film was processed to obtain maximum contrast, and the image density was measured in a densitometer to establish a density of each of the coils tested. The values obtained are summarized in the curve shown in FIGURE 8 in which the pressure in pounds per square inch is plotted against the density expressed in percent transmission.

In Table I below we have summarized the measurements of the breakdown voltage, the density grams per cubic inch and the percent increase in resistance for the coils compressed at the pressure indicated as follows:

TABLE I

| Example No. | Compacting Pressure (p.s.i.) | Breakdown Voltage | Density (grams per cubic inch) | Percent Increase in Resistance |
|---|---|---|---|---|
| 1 | 5,000 | 2,100 | 33.0 | 4.9 |
| 2 | 7,000 | 1,650 | 33.5 | 3.9 |
| 3 | 9,000 | 1,300 | 35.6 | 6.2 |
| 4 | 20,000 | 2,050 | 37.9 | 7.1 |
| 5 | 30,000 | 2,250 | 38.9 | 8.0 |
| 6 | 40,000 | 1,650 | 39.7 | 5.7 |

In FIGURES 10 to 15, we have shown an enlarged cross sectional view of a portion of the six coils, Examples 1–6 of Table I, and a cross sectional view of an identical coil that was not compressed. From a comparison of the cross section of the uncompacted coil shown in FIGURE 9 with the coil compressed at a pressure of 5,000 pounds per square inch, it will be seen that almost no deformation of the conductor wire has taken place. The increase in density of the coil is apparently due to the close packing of the conductors of the coil. In some conductors of the coils compressed at pressures of 7,000 and 9,000 pounds per square inch as shown in FIGURES 11 and 12, it will be observed that a definite deformation has taken place. At 20,000 pounds per square inch and above, as will be seen in FIGURES 13–15, all of the conductors have been deformed to a multi-sided cross section. For the aluminum coils used in this exemplification of our invention, it was found that a compression of the coil shown above 20,000 pounds per square inch did not result in any further improvement except for a slight decrease in coil size.

It will be understood that the pressure that should be used in a given application was determined by examining the cross section of a number of coils deformed at various pressures. Preferably, the lowest pressure that will provide a deformation of the circular cross section of the conductor wire to a multi-sided deformation was selected. Further, it was found that for a coil employing a copper conductor wire, pressures between 30,000 and 40,000 pounds per square inch were required to produce a satisfactory compression of the coil.

In order to investigate the heat stress characteristics of the compressed coils, embodying the invention, ten bifilar coils were wound with 0.038 aluminum magnetic wire having a polyvinyl formal resin insulation. All of the coils were compacted in the ring mold assembly shown in FIGURES 1 and 3 at a pressure of 20,000 pounds per square inch. The coils were subjected to the following heat cycle: The coils were placed in an oven heated to a temperature of 150° C. and were resistance heated by applying 2.8 volts across the coils for five minutes. This voltage was removed, and the coils were allowed to remain in the oven for an additional ten minutes. The coils were then removed from the oven and a potential of 450 volts was applied across the coils for 30 minutes at room temperature. A coil failure was considered to have occurred when a 0.4 ampere fuse failed in the line.

The cycle described above was repeated. After the 58th cycle, the voltage was raised in increments of 100 volts until the coil failed. The results of the heat-stress tests are summarized in Table II.

TABLE II

| Sample Coil Number | Number of Heat Cycles | Voltage at Failure |
|---|---|---|
| 1 | 100 | 900 |
| 2 | (*) | (*) |
| 3 | 100 | 900 |
| 4 | 84 | 800 |
| 5 | 84 | 800 |
| 6 | 74 | 700 |
| 7 | 100 | 900 |
| 8 | 94 | 800 |
| 9 | 100 | 900 |
| 10 | 94 | 800 |

*No failure.

To determine the thermal conductivity of sample coil compressed in accordance with invention, five coils were wound with an aluminum wire having a diameter of .038 of an inch and a polyvinyl formal resin enamel approximately .00145 of an inch in thickness. The coils were compressed in an axial direction at a pressure of 28 thousand pounds per square inch. The outer periphery of the coils was thermally insulated, and water was circulated through a water tube passing through the inside of the coils so that the heat generated by the coil was transferred to the water tube. The coils were heated by energizing the winding with D.C. current. Thermocouples were placed at the outside diameter and inside diameter of the coils to measure the temperature gradient.

The heat supplied to each coil was determined by the voltage applied across the coil and the current flowing in it. The heat flow to the cooling water was determined from temperature difference between the water at inlet and outlet of the cooling tube. The mean value of the thermal conductivity of these coils was found to be .064 watt-inch per square inch per degree centigrade. As compared to an identical coil that was not subjected to compression, it was found that the compressed coil embodying our invention had three times the thermal conductivity.

Although in the cylindrical coils used in the exemplification of the invention the compacting pressure was applied in a direction essentially parallel to the axis of a coil embodying the invention, it will be understood that the compacting pressure may be applied in both axial and transverse directions or an isostatic pressure may be applied to the coil.

For example, bifilar coils wound with 0.038 aluminum wire insulated with a polyvinyl formal resin enamel and having a conductor wire diameter to enamel thickness ratio, $D_o/h_o$, of approximately 26, were subjected to isostatic pressure. Prior to compression all of the coils were sealed in a plastic envelope and placed on a mandrel. The coils were then placed in a vessel, and the coils were subjected to a hydraulic pressure of 20,000 pounds per square inch and four of the coils were subjected to a hydraulic pressure of 40,000 pounds per square inch. Voltage breakdown measurements were taken using a voltage breakdown tester with a 250 volt per second rise and a 0.1 ampere trip as previously described. The voltage breakdown measurements are summarized in Table III below:

TABLE III

| Coil Number | Isostatic Pressure in Pounds per Square Inch | Breakdown Voltage |
|---|---|---|
| 1 | 20,000 | 2,200 |
| 2 | 20,000 | 2,600 |
| 3 | 20,000 | 2,200 |
| 4 | 20,000 | 2,200 |
| 5 | 40,000 | 4,400 |
| 6 | 40,000 | 2,100 |
| 7 | 40,000 | 3,400 |
| 8 | 40,000 | 2,800 |

To determine whether variations in the conductor wire thickness ratio $D_o/h_o$ above the preferred minimum effect on the breakdown voltage of the coil, a number of cylindrical coils were wound with different magnet wires. All the coils were compressed in the ring mold assembly shown in FIGURES 1 and 3. In one group of the coils the synthetic resin used on the magnet wire was the previously described polyvinyl formal resin known as Formex and in the other group all of the coils used a magnet wire insulated with a terephthalic polyester resin described in the Precopio and Fox Patent 2,936,296 and known in the trade under the trademark Alkanex. The wire diameter-enamel thickness ratio, $D_o/h_o$, the pressure in pounds per square inch at which the coil was compacted, and the breakdown voltage measured as previously described are summarized in Table IV below:

TABLE IV

| Sample Coil Number | $D_o/h_o$ | Compacting Pressure (p.s.i.) | Breakdown Voltage | Enamel |
|---|---|---|---|---|
| 1 | 20.2 | 10,000 | 3,100 | Alkanex. |
| 2 | 20.2 | 10,000 | 2,950 | Do. |
| 3 | 20.2 | 20,000 | 3,500 | Do. |
| 4 | 20.2 | 30,000 | 2,900 | Do. |
| 5 | 21.0 | 10,000 | 3,350 | Formex. |
| 6 | 21.0 | 10,000 | 3,150 | Do. |
| 7 | 21.0 | 20,000 | 4,500 | Do. |
| 8 | 21.0 | 30,000 | 3,900 | Do. |
| 9 | 31.7 | 10,000 | 5,000 | Alkanex. |
| 10 | 31.7 | 20,000 | 4,555 | Do. |
| 11 | 31.7 | 20,000 | 4,300 | Do. |
| 12 | 31.7 | 30,000 | 3,650 | Do. |
| 13 | 33.0 | 10,000 | 3,700 | Formex. |
| 14 | 33.0 | 10,000 | 4,600 | Do. |
| 15 | 33.0 | 20,000 | 3,850 | Do. |
| 16 | 33.0 | 30,000 | 4,700 | Do. |
| 17 | 95.0 | 10,000 | 2,550 | Alkanex. |
| 18 | 35.0 | 10,000 | 4,350 | Do. |
| 19 | 35.0 | 20,000 | 5,500 | Do. |
| 20 | 35.0 | 20,000 | 5,400 | Do. |
| 21 | 35.0 | 10,000 | 4,200 | Formex. |
| 22 | 35.0 | 10,000 | 5,250 | Do. |
| 23 | 35.0 | 20,000 | 3,900 | Do. |
| 24 | 35.0 | 20,000 | 4,500 | Do. |

In all of the sample coils tested increases in the coil density ranging from 15 to 20 percent were realized at compacting pressure of 20,000 pounds per square inch or more. Similar results were obtained with coils wound with magnet wire enamels such as polyvinyl formal-phenolic reacted with urethane, polyurethane and nylon. Other materials which may be used as an insulating enamel are the aromatic polycarboxylic imide, polyvinyl, butaryl, phenol-aldehyde and other synthetic resins. The stress and strain characteristics of these synthetic resins are believed to be such that the synthetic resin film around the conductor wire elongates during the conductor deformation without ruptures.

We have found that when a coil is compressed at relatively high pressures the insulating film is not completely squeezed out at the points of tangency between adjacent conductors and that metal-to-metal type of contacts between adjacent conductors do not result. Preferably, the thickness of the insulation film should be sufficient to provide adequate electrical insulation between the conductors after compression. If the insulation film thickness is too great, it will be appreciated that the voids between adjacent conductors will be filled out with very little squeeze out of the insulation and deformation of the conductor wire cannot be readily achieved. As a consequence, the compression of the coil will not result in any appreciable increase of the coil density.

By way of illustration, we compressed a coil in the ring mold assembly shown in FIGURES 1 and 3 to a pressure of 40,000 pounds per square inch. The coil was wound with a copper wire insulated with a polyvinyl formal resin. The enamel thickness $h_o$ was approximately .00035 of an inch and the conductor wire diameter was .0031. Thus, the diameter size film thickness ratio $D_o/h_o$ was 8.86. An enlarged cross section of a portion of the coil is shown in FIGURE 16. It will be seen that there has been no appreciable deformation of the conductor wire.

Preferably, the wire-diameter film thickness ratio, $D_o/h_o$, should not be less than 18. It was found that when the wire-diameter film thickness ratio is below 18, it is difficult to deform the conductor wire to achieve significant improvements in the space factor. As is illustrated in FIGURE 17, the film thickness $h_o$ represents the radial thickness of the synthetic resin film 41 and the diameter $D_o$ represents the bare diameter of the conductor wire 42.

The surge breakdown voltages of eight electrical coils of aluminum wire for a 30 frame, 2 pole stator of the spider and ring type were determined by tests. Four of the eight coils were compacted at a pressure of about 10,000 pounds per square inch to form a coil such as is shown in FIGURE 6 so that the compacted sections of the coil could be inserted into the core slots. The other five coils do not have any compacted coil sections. In each case the slot insulation used was a .006 of an inch thick resin strip slot liner.

In order to determine the surge breakdown voltages of these eight coils, a surge voltage was applied to the start lead of each coil while the finish lead of the coil was attached to a suitable ground. The voltage was gradually increased until failure occurred, and the surge breakdown voltage readings are set forth in Table V below:

TABLE V

| Compacted Coil | | Noncompacted Coil | |
| --- | --- | --- | --- |
| Coil No. | Breakdown Voltage (Peak Volts) | Coil No. | Breakdown Voltage (Peak Volts) |
| 1 | 5,600 | 5 | 8,500 |
| 2 | 7,400 | 6 | 11,000 |
| 3 | 7,350 | 7 | 8,850 |
| 4 | 5,450 | 8 | 9,400 |

From the data set forth in Table V, it will be seen that the average surge breakdown voltage level for the four coils having the compacted slot section is approximately 68 percent of the average breakdown voltage for the coils. It will be apparent, therefore, that it is possible with the improved compacted coil sections to achieve an appreciable suppression of a surge or transient type of voltage. This suppression is believed to result from the increased capacitance of the compacted slot section of the electrical coils. In view of this transient voltage suppression, it can be expected that degradation of the magnet wire insulation resulting from transient voltages will be reduced, and consequently, it can also be expected that the life characteristics of coils subjected to transient voltage stressing will be improved.

Capacitance measurements were taken of the 24 bifilar coils set forth in Table IV. The capacitance readings in picofarads were taken before and after the coils were compacted to the pressures indicated in Table IV, the capacitance being measured between the bifilar windings. These capacitance values are set out in Table VI below:

TABLE VI

| Sample Coil Number | Capacitance Before Compaction (picofarads) | Capacitance After Compaction (picofarads) |
| --- | --- | --- |
| 1 | 2,529 | 3,086 |
| 2 | 2,332 | 3,643 |
| 3 | 2,330 | 2,796 |
| 4 | 2,341 | 5,371 |
| 5 | 2,387 | 3,878 |
| 6 | 2,599 | 3,982 |
| 7 | 2,478 | 4,897 |
| 8 | 2,452 | 5,058 |
| 9 | 2,016 | 3,722 |
| 10 | 2,094 | 4,944 |
| 11 | 2,090 | 4,848 |
| 12 | 2,158 | 5,872 |
| 13 | 2,220 | 4,206 |
| 14 | 2,192 | 4,374 |
| 15 | 2,144 | 4,690 |
| 16 | 2,170 | 6,101 |
| 17 | 1,678 | 2,769 |
| 18 | 1,690 | 3,085 |
| 19 | 1,711 | 4,563 |
| 20 | 1,686 | 4,327 |
| 21 | 1,616 | 3,094 |
| 22 | 1,725 | 2,897 |
| 23 | 1,747 | 4,990 |
| 24 | 1,724 | 4,752 |

From the data shown in Table VI, it will be apparent that there is a substantial increase in the capacitance between turns in a coil that is compacted, and generally this capacitance will increase with the compacting pressure applied to the coil. It is believed that the additional capacitance provides the advantage that it can serve, in effect, as a capacitor connected in parallel with the coil to aid in the suppression of transient voltages and thereby minimize adverse effects on the coil insulation system that might result from such voltage transients.

In FIGURE 17 we have illustrated a center conductor 43 and its six adjacent conductors 44, 45, 46 and 47, 48 and 49 of a portion of precision would coil, the layers of which extend vertically as shown therein. As the conductors are compressed to the hexagonal shape shown in FIGURE 18, the voids 40 are eliminated, and the insulating film segments 36, 37 and 38, for example, which are shown in the triangle 39, are in effect stretched and conform to the change in geometry of the adjacent conductors.

It will be appreciated that in a precision wound coil, each layer of turns is formed of consecutively wound turns which are accurately positioned as shown in FIGURE 17 to prevent any fall-through of a turn to an adjacent layer. A random wound coil, however, is wound without any special provision being made for insuring that each turn of the conductor wire will fall in its proper layer. As a result, in a random wound coil a turn may be displaced one or more layers from its normal layer position or the position it would have occupied if the coil were precision wound. Although in the exemplifications of the invention the coils were generally precision wound it will be understood that the invention may be practiced on random wound type of coils. We have found for example, that coils random wound with aluminum magnet wire having a polyvinyl formal resin enamel and a wire diameter-film thickness ratio $D_o/h_o$ equal to 26 can be compressed at a pressure of 20,000 pounds per square inch in the mold assembly 12 of FIGURE 1 without appreciably impairing the electrical characteristics of the coil.

Figure 18:
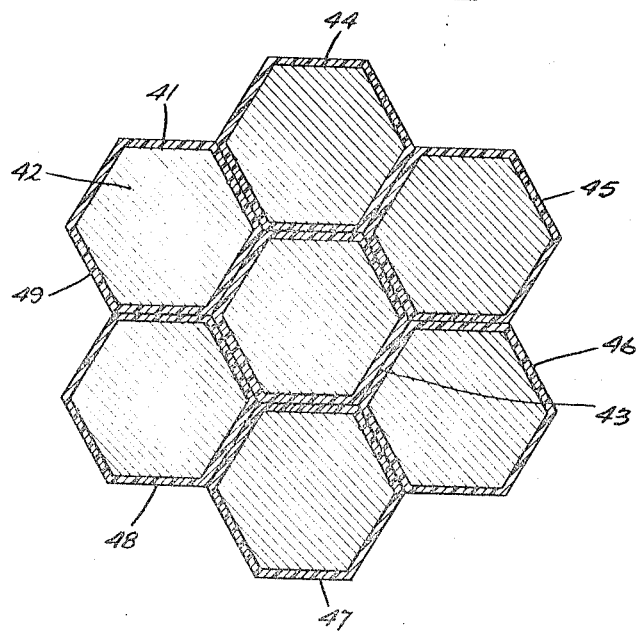
FIGURE 18 illustrates a cross section of the six conductors shown in FIGURE 17 compressed in accordance with the present invention.

In FIGURE 18 we have illustrated the seven conductors 43–49 after the conductors have been deformed by compressing the coil in a ring mold assembly 12 shown in FIGURES 1 and 3. It will be seen that ideally, in one form of the invention, the conductors are deformed to a hexagonal shape having two parallel sides which are normal to the direction in which the compressive force is applied. We have found that during compression of the coil the resin film, in effect, elongates to conform to the particular deformation imparted to the conductor wire and that the electrical characteristics are not appreciably affected since the continuity of the electrical insulating film between adjacent conductors, as is shown in FIGURE 18, is clearly maintained.

From the foregoing description, it will be apparent that it is possible to compress a coil or a portion of a coil at a pressure ranging from 10,000 to 40,000 pounds per square inch to achieve significant increases in coil density without any serious impairment of the electrical or physical properties of the coil. A substantial improvement in the thermal conductivity of a coil is achieved. Further, it will be appreciated that free standing coils can be readily provided since the compressive force applied to the coil bonds the insulation on the magnetic wire to form a unitary self-supporting coil structure.

While we have described herein several embodiments of our invention, it will be apparent to those skilled in the art that various changes and modifications may be made without departing from the invention. It is therefore intended in the appended claims to cover all such equivalent variations as fall within the true spirit and scope of our invention.

What we claim as new and desire to secure by Letters Patent of the United States is:

1. An electrical coil comprising: a plurality of turns of conductor wire forming a winding symmetrically disposed with respect to a central axis with more than two layers of conductors, said turns of conductor wire having a coating comprising a continuous layer of synthetic resin, preselected of said turns of conductor wire having at least five sides in cross section formed by compressive forces thereagainst by other of said turns of conductor wire in the range of 10,000 to 40,000 pounds per square inch, and at least some of said other turns having less than five sides in cross section, said coating conforming to said five sides of said preselected turns and to the sides of said other turns.

2. An electrical coil comprising: a plurality of turns of conductor wire forming a winding having at least two layers of conductors, said turns of conductor wire having a coating comprising a continuous layer of synthetic resin, at least a portion of preselected of said turns of conductor wire having a first number of sides in cross section formed by compressive forces thereagainst by portions of other of said turns of conductor wire in the range of 10,000 to 40,000 pounds per square inch, and said at least portions of the other turns having a second number of sides in cross section, with said first number of sides being greater than said second number of sides, and said coating conforming to said sides of said preselected turns and said other turns.

3. An electrical coil comprising: a plurality of turns of insulated conductor wire forming a winding with at least two layers of conductors symmetrically disposed with respect to an axis, said turns of conductor wire having a coating comprising a continuous layer of synthetic resin, at least portions of preselected of said turns of conductor wire having at least five sides in cross section formed by compressive forces thereagainst by at least portions of other of said turns of conductor wire in the range of 10,000 to 40,000 pounds per square inch, and said at least portions of said other turns being less than five sides in cross section, said coating conforming to said five sides of said preselected turns and to the sides of said other turns, and at least two sides of said coil being essentially in parallel relation.

4. A method of producing an electrical coil comprising the steps of: forming a winding of a plurality of turns of conductor wire having a circular cross section with a diameter $D_0$ and coated with an essentially uniform layer of synthetic resin having a radial thickness $h_0$, the ratio of $D_0/h_0$ being not less than 18, with preselected turns being encircled by other turns, and compressing at least a portion of said coil at a pressure between 10,000 and 40,000 pounds per square inch wherein at least said preselected turns are deformed from said circular cross section to a multi-sided cross section by the pressure of said other turns.

5. A method of producing an electrical coil comprising the steps of: forming a winding of a plurality of turns of insulated conductor wire wound symmetrically with respect to a central axis, said conductor wire having a circular cross section with a diameter $D_0$ and having an essentially uniform resin layer with a radial thickness $h_0$, the ratio of $D_0/h_0$ being not less than 18, placing at least a portion of the winding in a member having a predetermined shape, and compressing said portion of the winding in said member at a pressure between 10,000 and 40,000 pounds per square inch to deform all of the turns of said portion from said circular cross section in order to produce an electrical coil characterized by high capacitance and high transient voltage suppression between turns to a multi-sided cross section.

6. A method of producing an electrical coil comprising the steps of: forming a winding of more than two layers of conductor wire with preselected turns entirely encircled by other turns, said conductor wire having a circular cross section with a diameter $D_0$ and an essentially uniform layer of synthetic resin with a radial thickness $h_0$, the ratio of $D_0/h_0$ being not less than 18, placing the turns of conductor wire in a mold of a predetermined shape, and compressing the winding at a pressure between 10,000 and 40,000 pounds per square inch to bond said layers of synthetic resin and to deform said conductor wire from said circular cross section to a conductor wire having a multi-sided cross section with at least two sides thereof essentially in parallel relation.

7. A method of producing a free standing coil, said method comprising the steps of: forming a winding of turns of conductor wire with more than two layers of conductors symmetrically disposed with respect to a central axis, placing said winding in a mold, said conductor wire having a circular cross section with a diameter $D_0$ and also having an essentially uniform layer of synthetic resin with a radial thickness $h_0$, the ratio of $D_0/h_0$ being not less than 18, and applying a pressure between 10,000 and 40,000 pounds per square inch to deform the cross section of the conductor wire in said mold from said circular cross section to a multi-sided cross section with at least two sides thereof essentially in parallel relation, said parallel sides being normal to the axis of symmetry.

References Cited
UNITED STATES PATENTS

| | | | |
|---|---|---|---|
| 1,041,293 | 2/1911 | Keller | 336—223 |
| 1,956,826 | 5/1934 | Engholm | 29—155.5 |
| 2,286,759 | 6/1942 | Patnode | 336—223 X |

LEWIS H. MYERS, *Primary Examiner.*

E. A. GOLDBERG, *Assistant Examiner.*